2,921,943

METHOD OF BROMINATING DIBENZOPYRENE-DIONE

Willis A. Fisher, Snyder, and Walter R. Demler, Hamburg, N.Y., assignors to Allied Chemical Corporation, a corporation of New York No Drawing. Application December 26, 1957
Serial No. 705,124

7 Claims. (Cl. 260—362)

This invention relates to a method of brominating dibenzopyrene-dione, and more particularly to the production of Vat Orange 1 (New Colour Index No. 59105). It relates especially to improvements in the method of brominating dibenzo[a,h]pyrene-7,14-dione whereby improved dyeing properties are imparted to the resulting brominated product.

The system of numbering employed herein is that of "The Ring Index," Patterson and Cappell (1940), No. 3654.

Vat Orange 1, which is a dibromo-dibenzo[a,h]pyrene-7,14-dione in which the bromine substituents are probably in the 2,9-positions, is a well known vat dyestuff remarkable for the beautiful orange yellow shades of its dyeings and its fastness properties. It is widely used for dyeing and printing cotton.

The conventional method for manufacturing this dyestuff involves brominating dibenzo[a,h]pyrene-7,14-dione in chlorosulfonic acid or oleum as solvent and in the presence of a halogen carrier (U.S.P. 1,988,205). While the dyestuff thus prepared yields dyeings which possess good fastness to soaping at 75° C., the fastness to soaping at the boil is poor, and the dyestuff gives prints which are deficient in strength.

It has also been proposed to carry out the bromination in a mixture of aluminum chloride and salt (sodium chloride) as solvent for the reaction. But, owing to the high temperatures required to provide a fluid melt, the process is difficult to carry out efficiently and with consistent results, much bromine is lost, and the process produces a dyestuff which possesses much inferior solubility in the usual alkaline hydrosulfite vats employed in dyeing. This latter property is important, since modern methods of continuous dyeing (such as the Franklin and William processes) and the production of light shades now in fashion require the dyestuff, on vatting with alkaline hydrosulfite, to form "vats" and printing pastes that are completely free of specks or unvattable material which might damage the dyeings or prints.

An object of the present invention is to provide improvements in the bromination of dibenzo[a,h]pyrene-7,14-dione.

A further object of the present invention is to provide improvements in the bromination of dibenzo[a,h]pyrene-7,14-dione whereby Vat Orange 1 is produced in a form which gives dyeings having good fastness to soaping at the boil and good solubility in the usual alkaline hydrosulfite vats.

Other objects of the present invention in part will be obvious and in part will appear hereinafter.

We have discovered, in accordance with the present invention, that the bromination of dibenzopyrene-dione can be carried out advantageously in a fluid mixture of anhydrous aluminum chloride and at least one of the class of organic amides having the general formula:

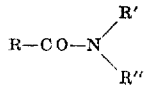

wherein R is hydrogen or the amino group, and R' and R" are each hydrogen or a lower alkyl group.

(The term "lower alkyl group" denotes and includes alkyl groups having 1 to 6 carbon atoms.)

Mixtures of this type containing from about 10% to 40% by weight of the organic amide are liquid practically at room temperature. Particularly suitable organic amides of this class are urea, formamide and dimethylformamide.

By the use of such low-melting mixtures of organic amide and aluminum chloride, the process of the present invention produces a superior product, and permits the addition and utilization of bromine at low temperatures, so that the bromination can be carried out more efficiently, more economically and more consistently than when using fused aluminum chloride-salt mixtures as solvent.

In carrying out the bromination, dibenzopyrene-dione is dissolved in a fluid mixture of anhydrous aluminum chloride and an organic amide of the above class. Liquid bromine is then added, preferably at a temperature below the boiling point of liquid bromine at the prevailing pressure, and the reaction mixture is then gradually heated to hasten completion of the bromination.

The amount of aluminum chloride-organic amide mixture employed relative to the dibenzopyrene-dione is not critical. Preferably at least sufficient of the mixture is employed to dissolve the dione and form a fluid reaction mass.

The relative proportions of aluminum chloride and organic amide in the fluid mixtures can vary. Ordinarily, at least sufficient amide is employed to provide a fluid mixture at temperatures of 40° C. and above. In the preferred practice of the invention, urea, formamide, dimethylformamide, or mixtures thereof are employed in amounts ranging from about 10% to about 40% of the weight of the aluminum chloride.

The aluminum chloride is employed in the anhydrous form, which may be of the technical or commercial grade.

The bromination may be carried out over a wide range of temperatures, for example, from about 40° to about 140° C. Temperatures of about 80° to about 120° C. are preferred for the production of the dibromide. At lower temperatures, a longer reaction period is required to obtain dibromination of the dione due to the slower reaction rate.

Various halogen carriers may be included in the reaction mixture in small amounts (for example, a few percent based on the weight of the dione) as is known in connection with the prior bromination procedures. For example, a small amount of ferric chloride or iodine may be added, and is preferably employed to facilitate the bromination.

The invention will be illustrated by the following specific example, but it is to be understood that it is not limited to the details thereof and that changes may be made without departing from the scope of the invention. The temperatures are in degrees centigrade and the parts and percentages are by weight, unless designated as parts by volume. Where parts are by volume, the amount signifies the volume occupied by the same number of parts by weight of water at 4° C.

Example

To a reaction vessel equipped with a mechanical stirrer and water-jacketed reflux condenser, 200 parts of 14-mesh commercial anhydrous aluminum chloride and 60 parts of urea were charged alternately in portions, while applying sufficient heat to raise the temperature to 80°–100°. The resulting fluid melt was cooled to 50°–55° and 2 parts of anhydrous ferric chloride were added as halogen carrier. Then 25 parts of dried and finely ground technical dibenzo[a,h]pyrene-7,14-dione were added in small portions over a period of about one-half hour, and the resulting fluid mixture was stirred for an additional half hour to dissolve the dione.

To the resulting solution at about 50°, 27 parts of liquid bromine were added rapidly. The temperature of the melt was then raised evenly over a period of about 5 hours to 120°, and held there for 12 hours to complete the bromination.

The resulting Vat Orange 1 was recovered and converted to a vat dye paste in the following manner. The reaction mass was drowned in 1500 parts by volume of cold water and stirred to obtain a smooth slurry, which was filtered and washed acid free. The filter cake was slurried in 1000 parts by volume of water acidified with 15 parts by volume of 20° Bé. hydrochloric acid, and the slurry was heated to 80°-90° and filtered while hot. The filter cake was washed acid free, and then converted to a standard vat dye paste by admixture with a small amount of a dispersing agent (Tamol) and water in the usual way.

The resulting dyestuff was subjected to standard tests for properties which are important in connection with its use as a vat dyestuff; namely, solubility in alkaline hydrosulfite vats, and properties of the dyeings and prints produced by the dyestuff, especially color strength and fastness to hot soaping.

The tests were carried out as follows:

Solubility in alkaline hydrosulfite

This is a standard test run by "vatting" a given amount of vat dye paste with a fixed amount of vatting solution consisting of a standard aqueous solution of sodium hydrosulfite and sodium hydroxide. The "vat" (aqueous solution of the leuco vat dye) thus obtained is filtered through filter paper, and the filter paper and any residue are washed with vatting solution, then with warm water, and finally with an oxidizing solution (sodium perborate). The solubility of the vat dye is judged on the basis of the time required for the "vat" to pass through the filter and the amount of residue left on the filter.

Fastness to soaping

This is a standard test run to see if a loss in strength occurs when standard vat dyeings are subjected to hot soaping in a standard aqueous soap solution. The tests are conducted at 75° for 5 minutes and 100° for 10 minutes.

When tested for solubility by the above test, the Vat Orange 1 obtained in accordance with the above example showed excellent solubility; filtration was rapid and substantially no residue was left on the filter. This was in contrast to the considerably inferior solubility of a comparative Vat Orange 1 obtained by brominating dibenzo[a,h]pyrene-7,14-dione in a fused anhydrous aluminum chloride-sodium chloride mixture as reaction medium, which left such a considerably greater amount of residue on the filter as to render the dyestuff commercially unacceptable for dyeing by continuous dyeing processes.

When compared with a Vat Orange 1 produced by brominating dibenzo[a,h]pyrene-7,14-dione in chlorsulfonic acid, the Vat Orange 1 obtained in accordance with the above example gave prints on cotton and rayon which were about 25% stronger; and it gave dyeings on cotton yarn which, after soaping at the boil, were about 30% stronger (the loss of color due to soaping at the boil was much less).

It will be evident that the invention is not limited to the details of the foregoing illustrative example and that changes can be made without departing from the scope of the invention.

Thus, equivalent results are obtained by effecting the bromination at a lower temperature, e.g.. 60°-80° C., although a longer period is required due to the slower reaction rate. Likewise, the use of a carrier, like ferric chloride or iodine, is not necessary, but it is usually preferred.

As is well known, commercial forms of Vat Orange 1 do not necessarily represent pure dibromo-dibenzopyrene-dione; accordingly the present invention is not limited to the production of a pure product. The dibrominated dyestuff obtained in the foregoing example contains about 30% bromine and we have found that our invention can be advantageously used to produce dibrominated dibenzo[a,h]pyrene-7,14-dione products containing from about 27% to about 33% bromine as determined by the usual Parr bomb method. Theory for pure dibromo-dibenzopyrene-dione is 32.7% bromine.

We claim:

1. The improvement in the method of brominating dibenzopyrene-dione which comprises carrying out the bromination in a fluid mixture of anhydrous aluminum chloride and an organic amide having the formula

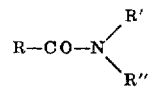

wherein R is selected from the group consisting of hydrogen and the amino radical, and R' and R" are each selected from the group consisting of hydrogen and lower alkyl radicals.

2. The improvement in the method of producing Vat Orange 1 by bromination of dibenzo[a,h]pyrene-7,14-dione which comprises reacting the dione with bromine in a fluid mixture of anhydrous aluminum chloride and 10% to 40% of its weight of an organic amide having the formula

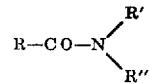

wherein R is selected from the group consisting of hydrogen and the amino radical, and R' and R" are each selected from the group consisting of hydrogen and lower alkyl radicals.

3. The improvement in the method of producing Vat Orange 1 defined in claim 2 in which the organic amide is urea.

4. The improvement in the method of producing Vat Orange 1 defined in claim 2 in which the organic amide is formamide.

5. The improvement in the method of producing Vat Orange 1 defined in claim 2 in which the organic amide is dimethylformamide.

6. The improvement in the method of brominating dibenzopyrene-dione which comprises dissolving the dione in a mixture of anhydrous aluminum chloride and an organic amide having the formula

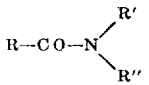

wherein R is selected from the group consisting of hydrogen and the amino radical, and R' and R" are each selected from the group consisting of hydrogen and lower alkyl radicals, said mixture being fluid at 40° C., adding liquid bromine to the resulting solution at a temperature below the boiling point of bromine, and heating the resulting mixture at a temperature not exceeding 140° C.

7. The improvement in the method of producing Vat Orange 1 by bromination of dibenzo[a,h]pyrene-7,14- dione which comprises dissolving the dione in a fluid mixture of anhydrous aluminum chloride and 10% to 40% of its weight of urea, adding liquid bromine to the resulting solution at a temperature below the boiling point of bromine, adding a small amount of a halogen carrier, and heating the resulting mixture at a temperature of about 80° to about 120° C. until dibrominated dibenzo[a,h]pyrene-7,14-dione is produced.

References Cited in the file of this patent
UNITED STATES PATENTS

| | | |
|---|---|---|
| 1,901,307 | Kraenzlein et al. | Mar. 14, 1933 |
| 1,988,205 | Kunz et al. | Jan. 15, 1935 |